(12) United States Patent
Basnayake et al.

(10) Patent No.: US 9,645,247 B2
(45) Date of Patent: May 9, 2017

(54) FAST ESTIMATION OF UTC TIME IN A MOBILE DEVICE USING GNSS

(71) Applicant: GENERAL MOTORS LLC, Detroit, MI (US)

(72) Inventors: Chaminda Basnayake, Ruthven (CA); Dipankar Pal, Sylvania, OH (US)

(73) Assignee: GENERAL MOTORS LLC, Detroit, MI (US)

(*) Notice: Subject to any disclaimer, the term of this patent is extended or adjusted under 35 U.S.C. 154(b) by 374 days.

(21) Appl. No.: 14/340,629

(22) Filed: Jul. 25, 2014

(65) Prior Publication Data
US 2016/0025859 A1    Jan. 28, 2016

(51) Int. Cl.
*G01S 19/23* (2010.01)
*G01S 19/39* (2010.01)
*G04R 20/06* (2013.01)

(52) U.S. Cl.
CPC ............ *G01S 19/39* (2013.01); *G04R 20/06* (2013.01)

(58) Field of Classification Search
CPC .......... G01S 19/23; G01S 19/39; G04R 20/06
USPC ................................................ 342/357.62
See application file for complete search history.

(56) References Cited

U.S. PATENT DOCUMENTS

| | | | |
|---|---|---|---|
| 2008/0218407 A1* | 9/2008 | Norda | G01S 19/14 342/357.46 |
| 2010/0060518 A1* | 3/2010 | Bar-Sever | G01S 19/27 342/357.66 |
| 2010/0141522 A1* | 6/2010 | Tsai | G01S 19/24 342/357.64 |
| 2011/0050495 A1* | 3/2011 | Huang | G01S 19/23 342/357.49 |
| 2011/0144911 A1* | 6/2011 | Madhavan | G01C 21/00 701/472 |
| 2011/0199262 A1* | 8/2011 | Karaoguz | G01S 19/37 342/357.64 |
| 2013/0012226 A1* | 1/2013 | Leclercq | H04W 4/001 455/456.1 |
| 2013/0328724 A1* | 12/2013 | Mayor | G01S 5/02 342/450 |
| 2014/0226446 A1* | 8/2014 | Kato | G04R 20/04 368/34 |

* cited by examiner

*Primary Examiner* — Harry Liu
(74) *Attorney, Agent, or Firm* — Leydig, Voit & Mayer, Ltd.

(57) ABSTRACT

A method is described for estimating the coordinated universal time (UTC). The method involves receiving, by a satellite navigation receiver, signals broadcast by a global navigation satellite service (GNSS) satellite. The signals encode a first time of week (TOW) value. The method also involves estimating a first week number (WN) value and a first relationship between the UCT and a reference time of an onboard clock of the GNSS satellite (OFFSET) from time parameter values stored at a local memory. The method determines a first estimate of the UTC from the first TOW value, the first WN value, and the first OFFSET.

14 Claims, 4 Drawing Sheets

FAST ESTIMATION OF UTC TIME IN A MOBILE DEVICE USING GNSS

TECHNOLOGY FIELD

The present disclosure relates generally to satellite navigation systems and more specifically to the use of satellite navigation systems to provide the coordinated universal time (UTC).

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Once provisioned and activated, telematics units can be utilized by a subscriber to obtain telematics services, such as those described herein, from the TSP.

One service provided by a TSP is a Global Navigation Satellite System (GNSS) based navigation service. GNSS is a generic term referring to any of multiple satellite constellation-based global positioning networks including, for example, the Global Positioning System (GPS) constellation. A particular example of a GNSS based navigation service is the provision of turn-by-turn (TBT) directions from a current location of a vehicle or an alternative start location to a specified destination.

A telematics unit equipped with a GNSS receiver can utilize the signals broadcast by GNSS satellites to calculate the coordinated universal time (UTC) with a high degree of accuracy. GNSS satellites continually broadcast signals that, when processed, provide a time at which the signal was transmitted (as measured by the satellites' onboard clocks) and a location at which the signal was transmitted. The telematics unit can use the information provided by the signals to calculate the UTC with a high degree of accuracy and thereby maintain a highly accurate on-board clock.

SUMMARY OF THE INVENTION

A method is described herein for estimating the coordinated universal time (UTC), the method comprising receiving, by a satellite navigation receiver, signals broadcast by a global navigation satellite service (GNSS) satellite of a GNSS that encode a first time of week (TOW) value, estimating a first week number (WN) value and a first relationship between the UCT and a reference time of an onboard clock of the satellite (OFFSET) from time parameter values stored at the satellite navigation receiver determining, from the first TOW value, the first WN value, and the first OFFSET value, a first estimate of the UTC.

An apparatus is described herein for estimating the coordinated universal time (UTC), the apparatus comprising an antenna configured to receive first signals broadcast by a global navigation satellite system (GNSS) satellite and to transmit the signals to a digital receiver, wherein the first signals contain a time of week (TOW) value, the digital receiver, configured to receive the first signals from the antenna, to convert the first signals to digital form, and to transmit the digital form of the first signals to a signal data accumulation buffer, a processor configured to analyze data stored at the signal data accumulation buffer, to determine that a TOW value is stored at the signal data accumulation buffer, to write the TOW value to a present time information buffer; to access data representing a first week number (WN) estimate and an estimate of a first relationship between the UCT and a reference time of an onboard clock of the satellite (OFFSET), and to determine a first estimate of the UTC from the first TOW value, the first WN value, and the first OFFSET, and a first memory comprising the signal data accumulation buffer and the present time information buffer.

BRIEF DESCRIPTION OF THE DRAWINGS

While the appended claims set forth the features of the invention with particularity, the invention, together with its objects and advantages, may be best understood from the following detailed description taken in conjunction with the accompanying drawings of which:

DETAILED DESCRIPTION OF THE DRAWINGS

Figure 1:
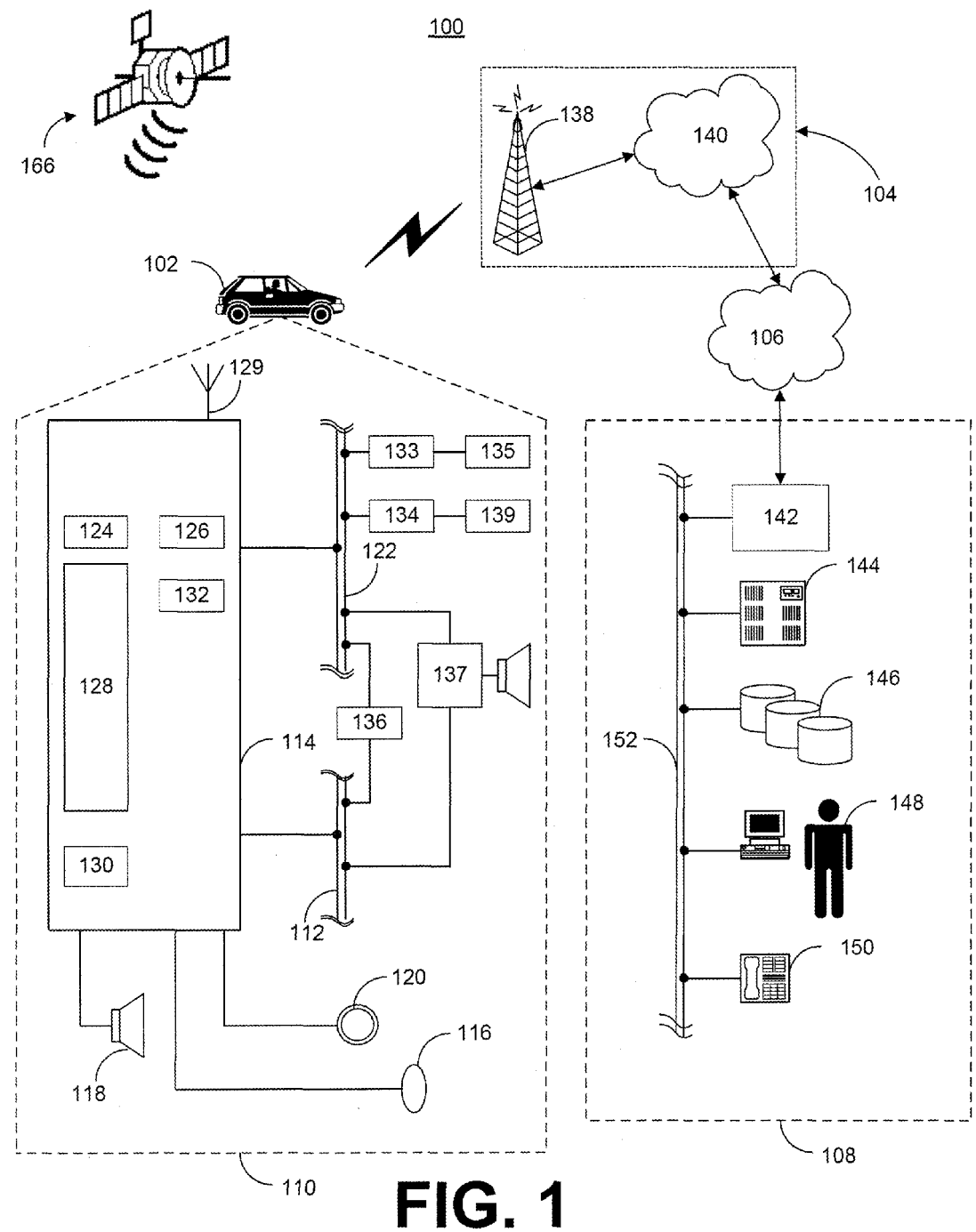
FIG. 1 is a schematic diagram of an operating environment for a mobile vehicle communication system usable in implementations of the described principles.

Implementations of the invention contemplate calculating the coordinated universal time (UTC) with a high degree of accuracy in a short amount of time by utilizing data stored at a non-volatile memory in conjunction with signals received from Global Navigation Satellite System (GNSS) satellites.

Signals broadcast by a GNSS satellite include a measurement, made by the satellite's onboard clock, of the time at which the signal was transmitted. However, the satellite's onboard clock does not derive its time from the UTC but is instead set to another reference time. Therefore, signals broadcast by the satellite will also indicate the difference between the reference time to which the satellite's onboard clocks are set and the UTC. For example, GPS satellites broadcast signals that indicate the offset between a GPS time scale, i.e. global positioning system time (GPST), and the UTC time scale. The GPST and the UTC were coincident at 00:00:00 on Jan. 6, 1980 but have since drifted apart due to the Earth's rotation. Specifically, the UTC accounts for leap seconds resulting from the Earth's rotation while the GPST is a continuous atomic time scale that does not account for leap seconds. The magnitude of the drift is approximately one half to one second per year, i.e. the offset between GPST and UTC changes by approximately one second every 1-2 years. GPS satellites broadcast a current value of the offset between the GPST and the UTC every 750 seconds. Implementations of the present invention contemplate storing the most recently broadcasted value of the offset between the GPST and the UTC at a durable memory location. In addition to the value of the offset between the GPST and the UTC (OFFSET), the time broadcasted by GPS satellites includes a value for a week number (WN) and a value for a time of week (TOW). A Gregorian date can be calculated from the WN value, the TOW value, and the OFFSET value.

Systems and methods for calculating the UTC from GNSS broadcast signals of the prior art require a considerable amount of time to calculate the UTC with a high degree of accuracy. For example, standard methods for calculating the UTC from GPS broadcast signals of the prior art require at least 6 seconds after acquiring a satellite to decode a TOW value from signals broadcast by the acquired satellite, require at least 30 seconds to decode the WN, and require at least 750 seconds to decode the GPS-UTC offset (OFFSET). The systems and methods of the prior art therefore require, after acquiring a first satellite of the GNSS, approximately 30 seconds to calculate the UTC accurate to within twenty seconds and 750 seconds to calculate the UTC accurate to within one second.

Implementations of the invention utilize an onboard oscillator and a non-volatile memory space to enable onboard estimation of the WN and the OFFSET after a period without GNSS connectivity. For example, a period of time during which a device experiences connectivity with a GPS satellite and receives and stores values of TOW, WN, and OFFSET broadcast by the GPS satellite may be followed by a period of time during which the device cannot connect to a GPS satellite and therefore cannot receive and store values for GPST parameters. Periods of time during which connectivity is absent can be caused, for example, by the device being powered down, by the device going to sleep, by the device moving into a location where signals broadcast by GPS satellites are too weak for GPST parameter values to be ascertained, or by the device otherwise being unable to receive or decode signals broadcast by GPS satellites. The length of the period of time without GNSS connectivity can be indicated by a value (COUNT) provided by the onboard oscillator. When a GNSS connection is reestablished, the present WN can be estimated from the stored GPST parameter values (i.e. the values of TOW, WN, and OFFSET last received by the device) and from the value COUNT. Implementations of the invention contemplate the use of any of a wide variety of low cost, high drift clocks to provide the value COUNT. Implementations of the invention can estimate the present, real-time WN value without a precise clock. Therefore, the device does not need a precise onboard clock (which are oftentimes expensive).

The systems and methods of the present invention require approximately 6 seconds to decode a TOW value from signals broadcast by a GNSS satellite but can calculate the UTC accurate to within 1 second from the decoded TOW.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present systems and methods and generally includes a vehicle 102, a wireless carrier system 104, a land network 106 and a communication center 108 of a telematics service provider (TSP). The vehicle 102 includes a satellite navigation component 132 for determining the location of the vehicle. It should be appreciated that the overall architecture, setup and operation, as well as the individual components of a system such as that shown in FIG. 1 are generally known in the art. Thus, the following paragraphs provide a brief overview of one such example information system 100. However, present systems and methods could be carried out in other environments as well.

Vehicle 102 is a mobile vehicle such as a motorcycle, car, truck, recreational vehicle (RV), boat, plane, etc., and is equipped with suitable hardware and software that enables it to communicate over system 100. The vehicle 102 is, in particular, driven by an electric motor that periodically requires recharging. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device providing a variety of services through its communication with the communication center 108, and generally includes an electronic processing device 128, one or more types of electronic memory 130, a mobile wireless component 124, a multi-function antenna 126, and a satellite navigation component 132. The satellite navigation component 132 is capable of determining the location of the vehicle with a high degree of accuracy. For example, the Satellite navigation component could determine that a vehicle is located at a particular point on a particular road. In one example, the multi-function antenna 126 comprises, and is carried out in the form of, a computer program and/or set of software routines executing within the electronic processing device 128.

The telematics unit 114 provides a variety of services through communications with the communications center 108. The telematics unit 114 includes an electronic processor 128, electronic memory 130, a mobile wireless component 124 including a mobile wireless chipset, a dual function antenna 126, and the satellite navigation component 132. In one example, the mobile wireless component 124 comprises an electronic memory storing a computer program and/or set of computer-executable instruction sets or routines that are transferred to, and executed by, the processing device 128. The mobile wireless component 124 constitutes a network access device (NAD) of the telematics unit 114.

The telematics unit 114 provides, for users, an extensive/extensible set of services. Examples of such services include: GNSS-based mapping/location identification, turn-by-turn directions, and other navigation-related services provided in conjunction with the satellite navigation component 132. The telematics unit 114 also provides airbag deployment notification and other emergency or roadside assistance-related services provided in connection with various crash and or collision sensor interface modules 156 and crash sensors 158 located throughout the vehicle.

GNSS navigation services are, for example, implemented based on geographic position information of the vehicle provided by the satellite navigation component 132. A user of the telematics unit 114 enters destination information, for example, and a route to a destination may be calculated based on the destination information and a current position of the vehicle determined by the satellite navigation component 132 at approximately the time of route calculation. Turn-by-turn (TBT) directions may further be provided on a display screen corresponding to the satellite navigation component 132 and/or through vocal directions provided through a vehicle audio component 154. The route calculation related processing may be performed at the telematics unit 114 or may by performed at the communications center 108.

GNSS services utilize signals broadcast by one or more of a plurality of GNSS satellites that are part of the GNSS, such as the GNSS satellite 166. In various implementations, the GNSS satellite 166 may be a medium Earth orbit (MEO) satellite that is a component of the United States NAVSTAR Global Positioning System (GPS), the Russian GLONASS, or the European Galileo positioning system. Alternative implementations of the invention contemplate that the satellite navigation system that includes the satellite from which the carrier signal is received do not have global coverage. In some such implementations, the satellite navigation system may be referred to as a regional navigation satellite system. The signals broadcast by the GNSS satellite 166 can be a radio frequency (RF) signal in the L-band. For example, the RF signals may be centered at frequencies of 1176.45 MHz (L5), 1227.60 MHz (L2), 1381.05 MHz (L3), and 1575.42 MHz (L1). The RF broadcast signals can be modulated by a pseudorandom noise (PRN) code, such as a Gold code. A carrier signal that is modulated by a PRN code can be expressed as a linear combination of sinusoids.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the wireless carrier system 104 so that voice and/or data transmissions occur over the communications channel. Vehicle communications are enabled via the mobile wireless component 124 for voice communications and a multi-function antenna 126 for data transmission and reception. For example, data pertaining to the gradient of a road traversed by the vehicle 102 can be transmitted by the telematics unit 114 to the communication center 108 via the multi-function antenna 126. Similarly, data pertaining to the gradient of a road segment included in TBT directions may be transmitted to the telematics unit 114 by the communication center 108 via the multi-function antenna 126.

To enable successful data transmission over the communications channel, multi-function antenna 126 applies some form of encoding or modulation to convert the digital data so that it can communicate through a vocoder or speech codec incorporated in the mobile wireless component 124. Any suitable encoding or modulation technique that provides an acceptable data rate and bit error can be used with the present method. The multi-function antenna 126 services both the satellite navigation component 132 and the mobile wireless component 124.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the communication center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the communication center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained.

Vehicle sensors 139, connected to various sensor interface modules 134 are operatively connected to the vehicle bus 122. Vehicle sensors 139 include sensors with capabilities that include but that are not limited to determining a battery's state of charge (e.g. as a percentage of the total charge capacity), the charging status of a battery (i.e. whether the battery is currently being charged), and the current rate at which the battery is being charged (e.g. as a rate of change of the percentage of capacity charged per unit time). The vehicle sensors 139 can also include but are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to communication center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The communication center 108 of the telematics service provider is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. These various call center components are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as application servers 144 and databases 146. For example, the databases 146 could be designed to store subscriber profile records or any other pertinent subscriber information. Although the illustrated example has been described as it would be used in conjunction with a manned call center, it will be appreciated that the communication center 108 can be any central or remote facility, manned or unmanned, mobile or fixed, to or from which it is desirable to exchange voice and data.

A portion of the databases 146 stores information pertaining to the identity of the telematics unit 114. For example, the databases 146 may store, for each vehicle enrolled in a program, an integrated circuit card identifier (ICCID) corresponding to the subscriber identity modules (SIMs) of the vehicle's telematics unit, an international mobile equipment identity (IMEI) corresponding to network access devices (NADs) integrated into the vehicle's telematics units, a mobile identification number (MIN), an electronic serial numbers (ESN), a mobile equipment identifier (MEID), an international mobile subscriber identity (IMSI) associated with the SIM cards of the vehicle's telematics unit, a mobile device number (MDN), a mobile station international subscriber directory number (MSISDN), a service set identifier (SSID), a media access control (MAC) address, and an internet protocol (IP) address associated with the vehicle's telematics unit. Additional information pertaining to a subscriber affiliated with a particular telematics unit 114 may also be stored in the databases 146. For example, billing information associated with the subscriber may be stored in the databases 146. The preceding examples of information that can be stored at databases 146 is not exhaustive, and additional fields of data may also be stored at databases 146.

The servers 144 interface with databases 146 and telematics units such as the telematics unit 114. The servers 144 have processors that can be configured to request and receive information from telematics units such as the telematics unit 114. In some implementations, information requested and received by the servers 144 is subsequently stored in the databases 146. For example, the servers 144 may request information pertaining to a sequence of road segments traversed by the vehicle 102 during a particular period of time and the gradient of the road on each road segment as calculated by the vehicle 102.

In general terms, not intended to limit the claims, the example environment depicted by FIG. 1 may be used by systems and methods that can estimate the UTC accurate to within one second from a TOW value decoded from signals broadcast by a GNSS satellite. Systems and methods described herein contemplate rapid onboard estimation of GNSS time value parameters through data stored at a non-volatile memory space during a period without GNSS connectivity. When a GNSS connection is reestablished, the systems and methods can rapidly estimate the value of the UTC accurate to within one second.

Figure 2:
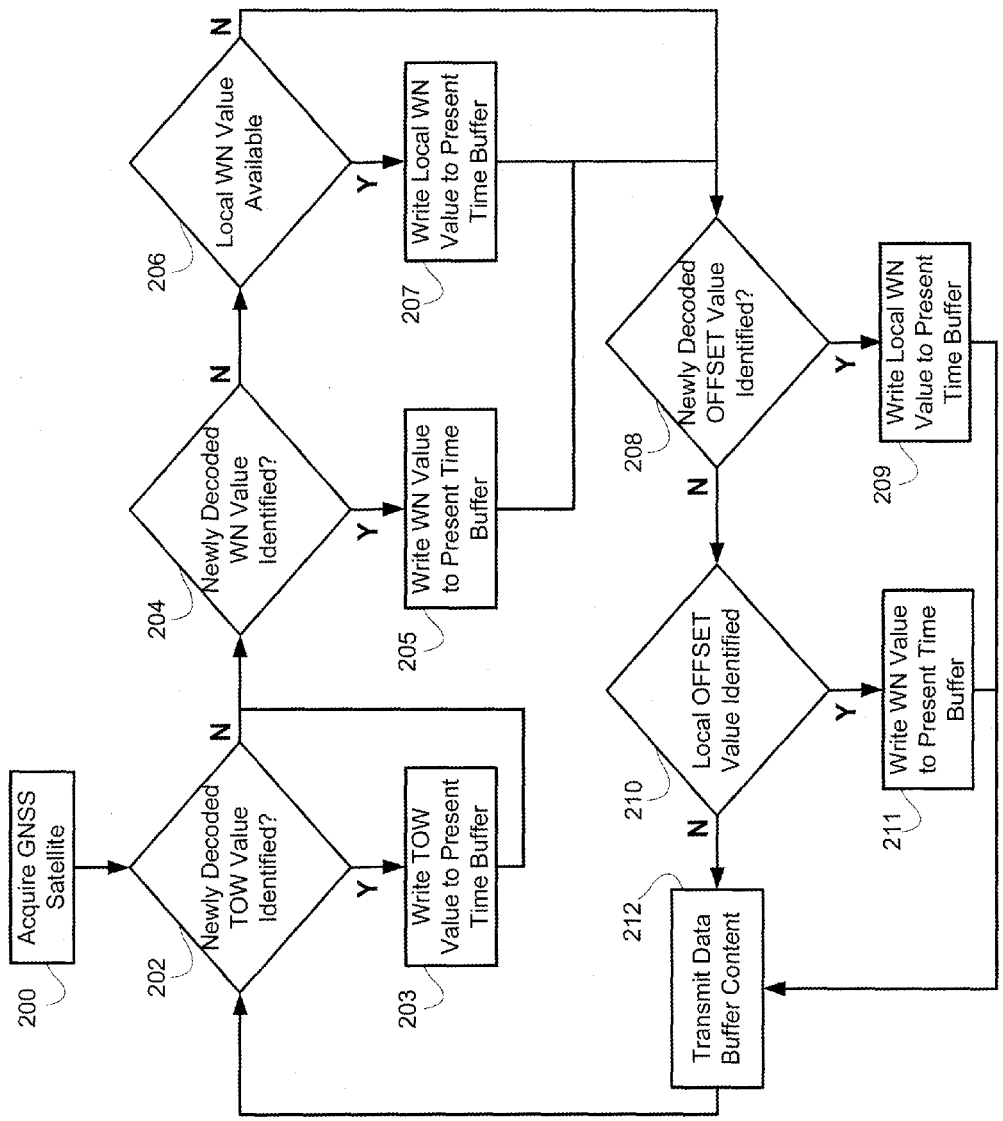
FIG. 2 is a flow diagram illustrating a process implemented by a telematics unit of a vehicle for estimating the UTC to a high degree of accuracy within a short amount of time after acquiring a GNSS satellite.

FIG. 2 is a flow diagram illustrating a process implemented by a telematics unit of a vehicle for estimating the UTC to a high degree of accuracy within a short amount of time after acquiring a GNSS satellite. At 200, the satellite navigation component 132 acquires the GNSS satellite 166 via the multi-function antenna 126 of the telematics unit 114.

At 202, a processor that is a component of the satellite navigation component 132 determines whether or not a time of week (TOW) value has been newly decoded from signals received from the satellite 166. In some implementations, the process determines that a TOW value has been newly decoded if, during the preceding iteration of the process, a signal processor of the satellite navigation component 132 identified data extracted from signals broadcasted by the GNSS satellite 166 and received by a receiver of the satellite navigation component 132 as a TOW value.

The dual mode antenna 126 must receive RF waves broadcast by the satellite 166 for a finite period of time in order to acquire the minimum amount of the data necessary to identify a TOW value. Therefore, data obtained from the RF waves received by the dual mode antenna 126 can be stored in a memory, e.g. a data buffer, for multiple iterations of the process depicted in FIG. 2 if necessary. In some implementations, a TOW value obtaining module may query the memory location where the data obtained from the RF waves received by the dual mode antenna 126 is stored at each iteration of the loop and output a signal indicating whether or not a TOW value has been newly decoded.

If a TOW value has been newly decoded, the process proceeds to 203 where the TOW value is written to a present time information data buffer. In some implementations, the present time information data buffer is implemented as a fixed location in a memory component, or memory module, of the satellite navigation component 132 or a component thereof. If the process determines at 202 that a TOW value has not been newly decoded, the process proceeds to 204.

In implementations where the satellite 166 is a member of the GPS GNSS, the signals received by the receiver of the satellite navigation component 132 compose a GPS navigation message broadcast by the satellite. GPS navigation messages are encoded in radio frequency (RF) waves that require a finite length of time to be produced and transmitted by GNSS satellites' broadcast antennas and to be received by antennas of GPS receivers, such as the multi-function antenna 126. As a result of the format of the GPS navigation message and the properties of the signals carrying it, the multi-function antenna 126 must receive RF signals for at least six seconds in order to receive sufficient data from which to decode a TOW value. Therefore, upon it takes the satellite navigation component 132 at least 6 seconds after acquisition of the GNSS satellite 166 to identify a TOW value broadcast by the GNSS satellite 166.

At 204, the processor of the satellite navigation component 132 determines whether or not a week number (WN) value has been newly decoded from signals broadcast by the satellite 166. In some implementations, the process determines that a WN value has been newly decoded if, during the preceding iteration of the process, a signal processor of the satellite navigation component 132 identified data extracted from signals broadcasted by the GNSS satellite 166 and received by a receiver of the satellite navigation component 132 as a WN value.

The dual mode antenna 126 must receive RF waves broadcast by the satellite 166 for a finite period of time in order to acquire the minimum amount of the data necessary to identify a WN value. Therefore, data obtained from the RF waves received by the dual mode antenna 126 can be stored in a memory, e.g. a data buffer, for multiple iterations of the process depicted in FIG. 2 if necessary. In some implementations, a WN value obtaining module may query the memory location where the data obtained from the RF waves received by the dual mode antenna 126 is stored at each iteration of the loop and output a signal indicating whether or not a WN value has been newly decoded. In implementations where the satellite 166 is a member of the GPS GNSS, the dual mode antenna 126 must receive RF waves broadcast by the satellite 166 for at least 30 seconds in order to acquire the minimum amount of the data necessary to identify a WN value.

If the process determines at 204 that a WN value has been newly decoded, the process proceeds to 205 where the WN value received from the satellite 166 is stored in the present time information data buffer. If a WN value has not been newly decoded at 204, the process proceeds to 208.

At 206, the satellite navigation component 132 determines whether or not a local WN value is available. A local WN value is available if a WN value decoded from signals broadcast by a GNSS satellite during a prior GNSS connectivity period was stored in non-volatile memory prior to the establishment of the GNSS connectivity period in which the process depicted in FIG. 2 executes. The WN value decoded from signals received during the prior connectivity period may be transmitted to a processor cache of the satellite navigation component 132 from the non-volatile memory such that the availability of a local WN value can be rapidly ascertained at 206. The specific, numerical WN value stored locally at the device is determined from the WN value decoded from signals broadcast by a GNSS satellite during a prior period of connectivity between the satellite navigation component and a GNSS and from a value COUNT provided by an onboard clock that is an estimate of the time that has elapsed since the WN value obtained during the prior GNSS connectivity period was received.

If the process determines that a local WN value is available at 206, the process proceeds to 207 where the local WN value is written to the present time information data buffer. If the process determines at 206 that a WN value is not stored in non-volatile memory, the process proceeds to 208.

At 208, the processor of the satellite navigation component 132 determines whether a value for the difference (OFFSET) between the reference time to which the satellite's onboard clocks are set and the UTC has been newly decoded from signals broadcast by the satellite 166. In some implementations, the process determines at 204 that an OFFSET value has been newly decoded from signals broadcast by the satellite 166 if, during the preceding iteration of the process, a signal processor of the satellite navigation component 132 identified data extracted from signals received by a receiver of the satellite navigation component 132 as an OFFSET value.

As with TOW and WN values, the dual mode antenna 126 must receive RF waves broadcast by the satellite 166 for a finite period of time in order to acquire the minimum amount of data necessary to identify an OFFSET value. Therefore, data obtained from the RF waves received by the dual mode antenna 126 can be stored in a memory, e.g. a data buffer, for multiple iterations of the process depicted in FIG. 2 if necessary. In some implementations, an OFFSET value obtaining module may query the memory location where the data obtained from the RF waves received by the dual mode antenna 126 is stored at each iteration of the loop and output a signal indicating whether or not an OFFSET value has been newly decoded. In implementations where the satellite 166 is a member of the GPS GNSS, the dual mode antenna 126 must receive RF waves broadcast by the satellite 166 for at least 750 seconds in order to acquire the minimum amount of the data necessary to identify an OFFSET value.

If the process determines at 208 that an OFFSET value has been received, the process proceeds to 209 where the OFFSET value received from the satellite 166 is stored in the present time information data buffer. If an OFFSET value was not received at 208, the process proceeds to 210.

At 210, the satellite navigation component 132 determines whether or not a local OFFSET value is available. A local OFFSET value is available if an OFFSET value decoded from signals broadcast by a GNSS satellite during a prior GNSS connectivity period was stored in non-volatile memory prior to the establishment of the GNSS connectivity period in which the process depicted in FIG. 2 executes. The OFFSET value decoded from signals received during the prior connectivity period may be transmitted to a processor cache of the satellite navigation component 132 from the non-volatile memory such that the availability of a local OFFSET value can be rapidly ascertained at 210. The specific, numerical OFFSET value stored locally at the device can be determined from the OFFSET value decoded from signals broadcast by a GNSS satellite during a prior period of connectivity between the satellite navigation component and a GNSS and from a value COUNT provided by an onboard clock. The value COUNT is an estimate of the time that has elapsed since the OFFSET value obtained during the prior GNSS connectivity period was received.

If the process determines that a local OFFSET value is available at 210, the process proceeds to 211 where the local OFFSET value is written to the present time information data buffer. If the process determines at 210 that a local OFFSET value is not available, the process proceeds to 212.

At 212, the process outputs the content of the data buffer before returning to 200. In various implementations, the process may output the content of the present time information data buffer to various receivers. For example, the process may output the content to a memory address used to set an onboard time for the vehicle. The process may also output the content to a GPS position calculating processor module of the satellite navigation component 132. The calculation of the current UTC by the GPS position calculating processor module of the satellite navigation component 132 may also be a component of the process depicted in FIG. 2, e.g. as a component of 212.

A variety of implementations of the invention may include deviations from the process flow to that depicted in FIG. 2. In some implementations, the process may return to 200 if a TOW value is not newly decoded at 202. In such implementations, a value determined from a local oscillator and a TOW value stored in the data buffer may be written over the TOW value stored in the present time information data buffer. Similarly, the process may return to 200 if a WN value is not newly decoded at 204 and may return to 200 if an OFFSET value is not newly decoded at 208 in various implementations. In such implementations, WN and OFFSET values may determined from any or a combination of a value output by an oscillator, a comparison of TOW values written to the present time information data buffers during different iterations of the process, and WN and OFFSET values stored at the present time information data buffer, and such WN and OFFSET values may be written over the WN and OFFSET values stored at the present time information data buffer.

In some implementations, an estimate of the UTC may be calculated at any of 203, 205, 207, 209, and 211 and written to the present time information data buffer. An UTC error range may also be calculated and stored at the data buffer at any of 203, 205, 207, 209, and 211. In some implementations, if, at 206 and 210, local values of WN and OFFSET are not available, the process may write a null value to the present time information data buffer before proceeding. Similarly, the process may record an indication at 206 and 210 if local values of WN and OFFSET are not available and write null values to the data buffer at 212 immediately prior to outputting the content of the present time information data buffer.

At any of 203, 205, 207, 209, and 211, alternative implementations may employ a process in which the value of TOW, WN, or OFFSET is written with a header or other indicator to identify the origin of the value, i.e. GNSS satellite 166 or local memory. In such implementations, the header or indicator may be utilized at 212 to determine the identify of receivers to which the information is transmitted.

Implementations of the invention may also eliminate certain portions of the process flow depicted in FIG. 2 or conditionally traverse certain portions of the process. For example, the process may circumnavigate steps 204 through 211 for a certain number of iterations and only periodically proceed through such steps. For example, the process may proceed in the following order: 202, 203, 206, 207, 210, 211. This abbreviated process may limit the computational steps required in situations where a device has reacquired connectivity with a GNSS after a period during which the device was not connected to the GNSS.

Some implementations may determine, as an initial step, that the device is reacquiring connectivity with a GNSS and trigger the execution of an abbreviated process. Such a process may, for example, be defined by a flow represented by the following sequence: 206, 207, 210, 211, 202, 203, 212. This process flow would enable the device to determine, as an initial step, that it is not necessary to determine whether newly decoded values of WN and OFFSET have been identified or to wait to receive such values in broadcast signals. Instead, the process flow would expedite the transmission of GNSS time value parameters, for example to a processor for UTC calculation.

Implementations may clear the data from data buffers, e.g. the present time information data buffer, at various stages of the process. For example, the process may instruct the data buffers that store data representative of the signals received from the GNSS satellite 166 may be cleared upon a determination that the data stored in the data buffer identifies a TOW value, a WN value, or an OFFSET value.

Figure 3:
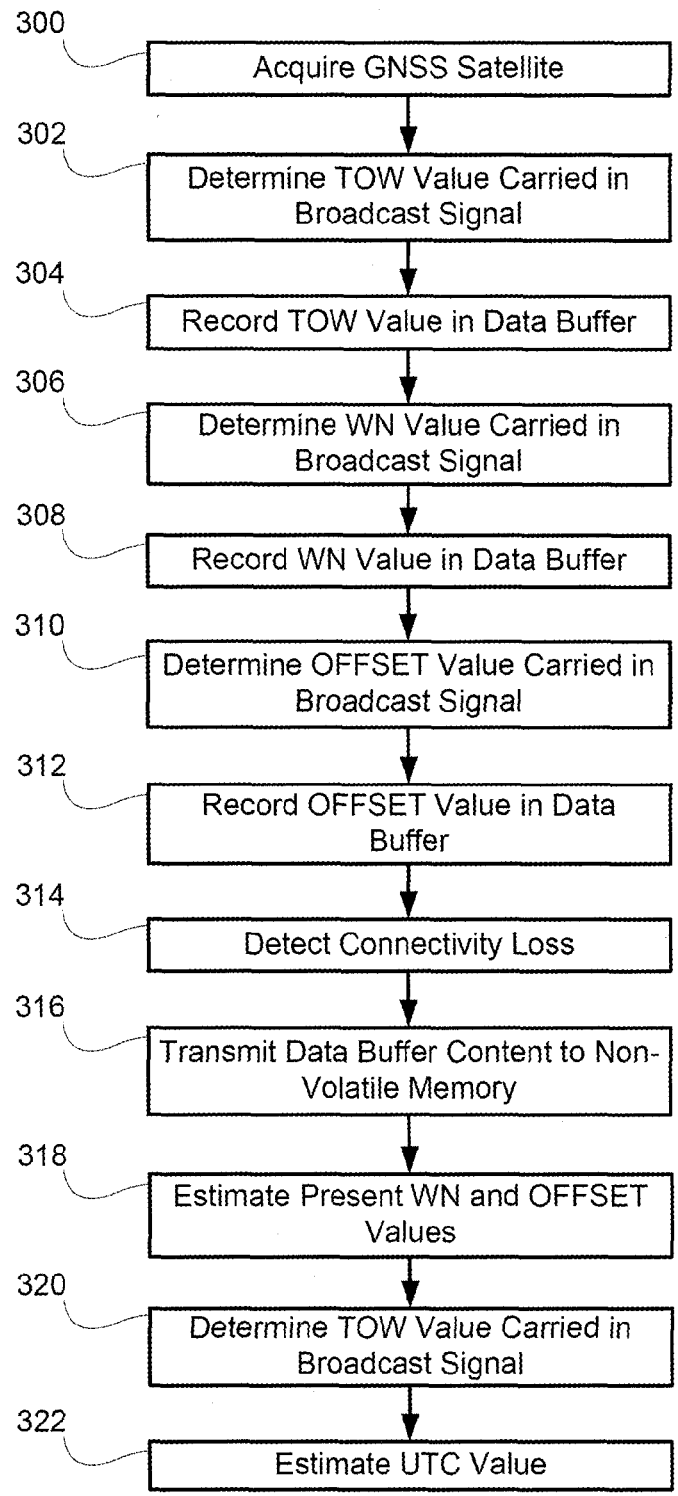
FIG. 3 is a flow diagram illustrating a sequence whereby a telematics unit determines a UTC time from signals broadcast by a GNSS satellite, loses connectivity with the satellite, and reacquires the satellite and estimates the UTC to a high degree of accuracy within a short amount of time after the reacquisition.

FIG. 3 is a flow diagram illustrating a sequence whereby a telematics unit determines a UTC time from signals broadcast by a GNSS satellite, loses connectivity with the satellite, and reacquires the satellite and estimates the UTC to a high degree of accuracy within a short amount of time after the reacquisition. At 300, the satellite navigation component 132 acquires the GNSS satellite 166. Acquisition is accomplished through the receiving, by the dual mode antenna 126, of signals broadcast by the GNSS satellite 166.

At 302, the satellite navigation component 132 determines a value of a time of week (TOW) carried in signals broadcast by the GNSS satellite 166. In addition, the satellite navigation component 132 can determine a value of a time at which the broadcast signals carrying the TOW value were received. The time at which the broadcast signals were received can be measured by an onboard clock of the vehicle. Determining a TOW value from the signals broadcast by the GNSS satellite can include, receiving radio frequency (RF) wave signals by the dual mode antenna 126, transmitting the RF wave signals to a transducer, recording data carried by the RF waves in a data buffer, analyzing the data stored in the data buffer to determine if a TOW value has been received, and transmitting the TOW value to a processor or processing module. At 304, the satellite navigation component 132 records the TOW value in a data buffer and, optionally, also records a value of the measurement of the time at which the broadcast signals carrying the TOW were received.

At 306, the satellite navigation component 132 determines a value of a week number (WN) carried in signals broadcast by the GNSS satellite 166. In addition, the satellite navigation component 132 can determine a value of a time at which the broadcast signals carrying the WN value were received. The time at which the broadcast signals were received can be measured by an onboard clock of the vehicle. Determining a WN value from the signals broadcast by the GNSS satellite can include, receiving radio frequency (RF) wave signals by the dual mode antenna 126, transmitting the RF wave signals to a transducer, recording data carried by the RF waves in a data buffer, analyzing the data stored in the data buffer to determine if a WN value has been received, and transmitting the WN value to a processor or processing module. At 308, the satellite navigation component 132 records the WN value in a data buffer and, optionally, also records a value of the measurement of the time at which the broadcast signals carrying the WN were received.

At 310, the satellite navigation component 132 determines a value of value of the difference (OFFSET) between the reference time to which the satellite's onboard clocks are set and the UTC. In addition, the satellite navigation component 132 can determine a value of a time at which the broadcast signals carrying the OFFSET value were received. The time at which the broadcast signals were received can be measured by an onboard clock of the vehicle. Determining an OFFSET value from the signals broadcast by the GNSS satellite can include, receiving radio frequency (RF) wave signals by the dual mode antenna 126, transmitting the RF wave signals to a transducer, recording data carried by the RF waves in a data buffer, analyzing the data stored in the data buffer to determine if an OFFSET value has been received, and transmitting the OFFSET value to a processor or processing module. At 312, the satellite navigation component 132 records the OFFSET value in a data buffer and, optionally, also records a value of the measurement of the time at which the broadcast signals carrying the OFFSET value were received.

At 314, the process detects a loss of connectivity with the GNSS satellite 166. At 316, the process transmits the contents of the data buffer, e.g. values of TOW, WN, OFFSET, UTC, UTC error range, and the times at which the signals carrying such values were received to a non-volatile memory. The non-volatile memory may be a non-volatile memory element of the satellite navigation component 132 or a non-volatile portion of the memory 130. The values for TOW, WN, OFFSET, UTC, UTC error range, and signal receipt times stored at the non-volatile memory may be referred to as connection loss time values as they coincide with the loss of a connection between the satellite navigation component 132 and the GNSS. The process may also initiate an onboard counter at 316. In some implementations, the onboard counter stores a value of zero upon being initialized and continually updates the stored value such that it always maintains a value representative of the time that has elapsed since its initialization. In some implementations the onboard counter is incremented in response to signals received from an oscillator.

At 316, the GNSS satellite 166 is reacquired by the satellite navigation component 132. At 318, the process utilizes the connection loss time values stored at the non-volatile memory and times measured by the onboard counter (e.g. a value (COUNT) for the length of each of the time intervals beginning with the receiving of the connection loss time values at 302, 306, and 310 and ending with the reacquisition of the GNSS at 316) to estimate a present WN value and a present OFFSET value. The present WN value and the present OFFSET value can be estimated by adding a value determined from the length of the time intervals to the stored values of TOW, WN, and OFFSET. The values calculated at 318 are utilized as local WN and OFFSET values and can be continually incremented in order to maintain updated COUNT values. At 320, the satellite navigation component 132 determines a value of a time of week (TOW) carried in signals broadcast by the GNSS satellite 166. In some implementations, step 320 is performed before step 318.

At 322, the process estimates the UTC time from the TOW value determined at 320 and the local WN and OFFSET values estimated at 318. In this manner, the process can estimate the UTC time accurate to within one second without waiting to receive such values from the GNSS satellite.

Figure 4:
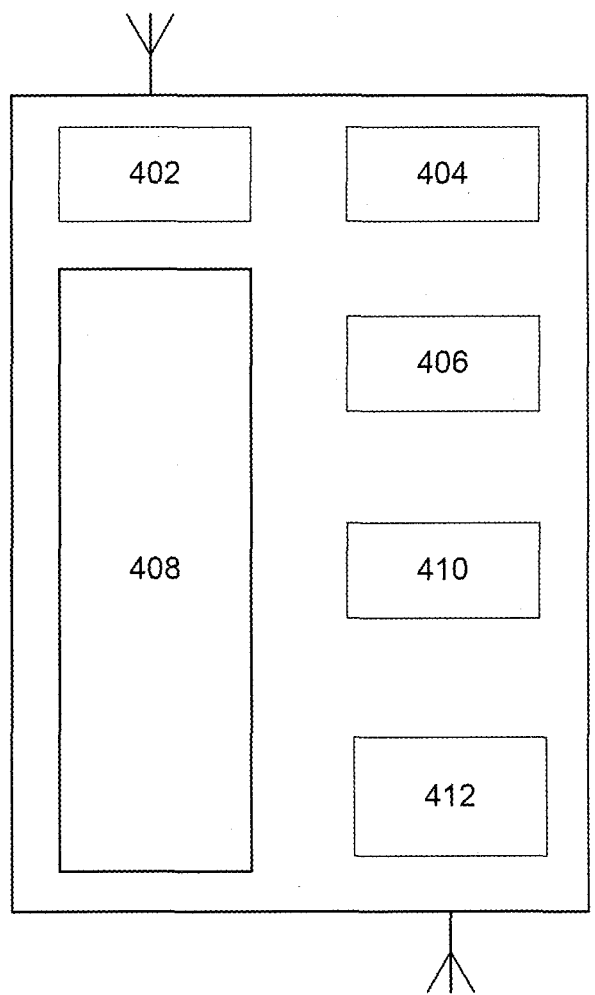
FIG. 4 is block diagram of a satellite navigation component of a telematics unit configured to calculate UTC to a high degree of accuracy within a short amount of time of reconnecting with a GNSS.

FIG. 4 is block diagram of the satellite navigation component 132 of the telematics unit 114 configured to calculate UTC to a high degree of accuracy within a short amount of time of reconnecting with a GNSS. The satellite navigation component 132 includes a receiver 402, a signal processor 404, a signal data accumulation data buffer 406, a processor 408, a present time parameter buffer 410, and a transmitter 412.

The receiver 402 is configured to receive signals received from the dual mode antenna 126 and originally broadcast by GNSS satellite 166. The receiver is further configured to direct the signals to the signal processor 404.

The signal processor 404 is configured to receive the signals from the antenna and to convert the signals into a digital form, e.g. produce a digital representation, or digitization, or the signals received by the antenna. The signal processor 404 can also be configured to identify components of the digital form of the signals that time value parameters, e.g. a TOW value or a WN value. The signal processor 404 is also configured to write data representative of the signals received by the antenna to the signal data accumulation data buffer 406. The signal processer may identify particular locations in the data accumulation buffer that correspond to particular time value parameters.

The signal data accumulation data buffer 406 is configured to store digital representations of the signals broadcast by the satellite and received by the antenna 402. The signal data accumulation data buffer 406 can be formed of volatile or non-volatile memory components and may be partitioned into different segments for storing data representative of each of a TOW value, a WN value, an OFFSET value, and other values.

The processor 408 is configured to analyze data stored at the signal data accumulation data buffer 406 and to determine whether the data stored at the signal data accumulation data buffer specifies a time parameter value, e.g. a TOW value or a WN value. The processor 408 is further configured to write a time parameter value to the time parameter value buffer 410. The processor 408 is also configured to estimate a UTC value from time parameter values and access a non-volatile memory storing time parameter values.

The time parameter value buffer 410 is configured to store data representative of various time parameters, e.g. a TOW value, a WN value, and a UTC value. The time parameter value buffer 410 can be formed of volatile or non-volatile memory components and may be partitioned into different segments for storing data representative of each of a TOW value, a WN value, an OFFSET value, a UTC value, and a UTC error range.

The transmitter is configured to transmit data from the satellite navigation component 132. The transmitter may be connected to other processing modules within the satellite navigation component 132 and, either directly or indirectly, to other components of the telematics unit 114, such as the memory 130 and the processor 128.

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit 114 may be carried out according to stored recommendations or applications installed on the telematics unit 114, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for estimating the coordinated universal time (UTC), the method comprising:
   receiving, by a satellite navigation receiver, first global navigation satellite service (GNSS) signals broadcast by a satellite of a GNSS that encode a first time of week (TOW) value;
   estimating a first week number (WN) value and a first relationship between the UTC and a reference time of an onboard clock of the satellite (OFFSET) from time parameter values stored at the satellite navigation receiver; and
   determining a first estimate of the UTC based on the first TOW value, the first WN value, and the first OFFSET value;
   wherein prior to receiving the first GNSS signals, the method further comprises:
   receiving second GNSS signals that encode a second TOW value, a second WN value, and a second OFFSET;
   determining that a GNSS connection for the satellite navigation receiver has been lost; and
   in response to determining that the GNSS connection has been lost, storing the second TOW value, the second WN value, and the second OFFSET at a non-volatile memory;
   wherein the second TOW value, the second WN value, and the second OFFSET stored at the non-volatile memory are utilized to determine the time parameter values stored at the satellite navigation receiver.

2. The method of claim 1, wherein the first estimate of the UTC is accurate to within one second.

3. The method of claim 2, wherein the first estimate of the UTC is determined less than 750 seconds after the satellite navigation receiver receives the signals broadcast by the GNSS satellite.

4. The method of claim 2, wherein the first estimate of the UTC is determined less than 30 seconds after the satellite navigation receiver receives the signals broadcast by the GNSS satellite.

5. The method of claim 1, wherein the GNSS is the United States Global Positioning System (GPS) and the reference time of an onboard clock of the satellite is GPS time (GPST).

6. The method of claim 1, further comprising storing the first TOW value at a data buffer.

7. The method of claim 1, further comprising storing data representative of the signals broadcast by the GNSS satellite at a data buffer.

8. The method of claim 7, further comprising determining that the data buffer contains a TOW value, wherein determining the first estimate of the UTC is triggered by determining that the data buffer contains a TOW value.

9. The method of claim 1, wherein the time parameter values stored at the satellite navigation receiver are determined by incrementing the second TOW value, the second WN value, and the second OFFSET in response to a signal produced by an oscillator.

10. An apparatus for estimating the coordinated universal time (UTC), the apparatus comprising:
    an antenna configured to receive first global navigation satellite system (GNSS) signals broadcast by a satellite of a GNSS, wherein the first GNSS signals contain a time of week (TOW) value;
    a digital receiver, configured to convert the first GNSS signals to digital form; and
    a processor, configured to estimate a first week number (WN) value and a first relationship between the UTC and a reference time of an onboard clock of the satellite (OFFSET) from stored time parameter values, and to determine a first estimated of the UTC based on the first TOW value, the first WN value, and the first OFFSET value;
    wherein the apparatus further comprises a non-volatile memory configured to store the time parameter values;
    wherein the antenna is further configured to receive second GNSS signals comprising a second TOW value, a second WN value, and a second OFFSET;
    wherein the digital receiver is further configured to convert the second GNSS signals to digital form; and
    wherein the processor is further configured to determine that a GNSS connection with the apparatus has been lost and to write the second TOW value, the second WN value, and the second OFFSET to the non-volatile memory.

11. The apparatus of claim 10, wherein the first estimate of the UTC is accurate within one second.

12. The apparatus of claim 11, wherein the processor is configured to determine the estimate of the UTC in less than 750 seconds after a first signal is received from the GNSS satellite by the antenna.

13. The apparatus of claim 11, wherein the processor is configured to determine the estimate of the UTC in less than 750 seconds after a first signal is received from the GNSS satellite by the antenna.

14. The apparatus of claim 10, wherein the GNSS is the United States Global Positioning System (GPS) and the reference time of an onboard clock of the satellite is GPS time (GPST).

* * * * *